Feb. 12, 1935.  G. A. LYON  1,991,327
SHOVE DOWN SPARE TIRE AND WHEEL COVER
Filed Aug. 19, 1933  2 Sheets-Sheet 1
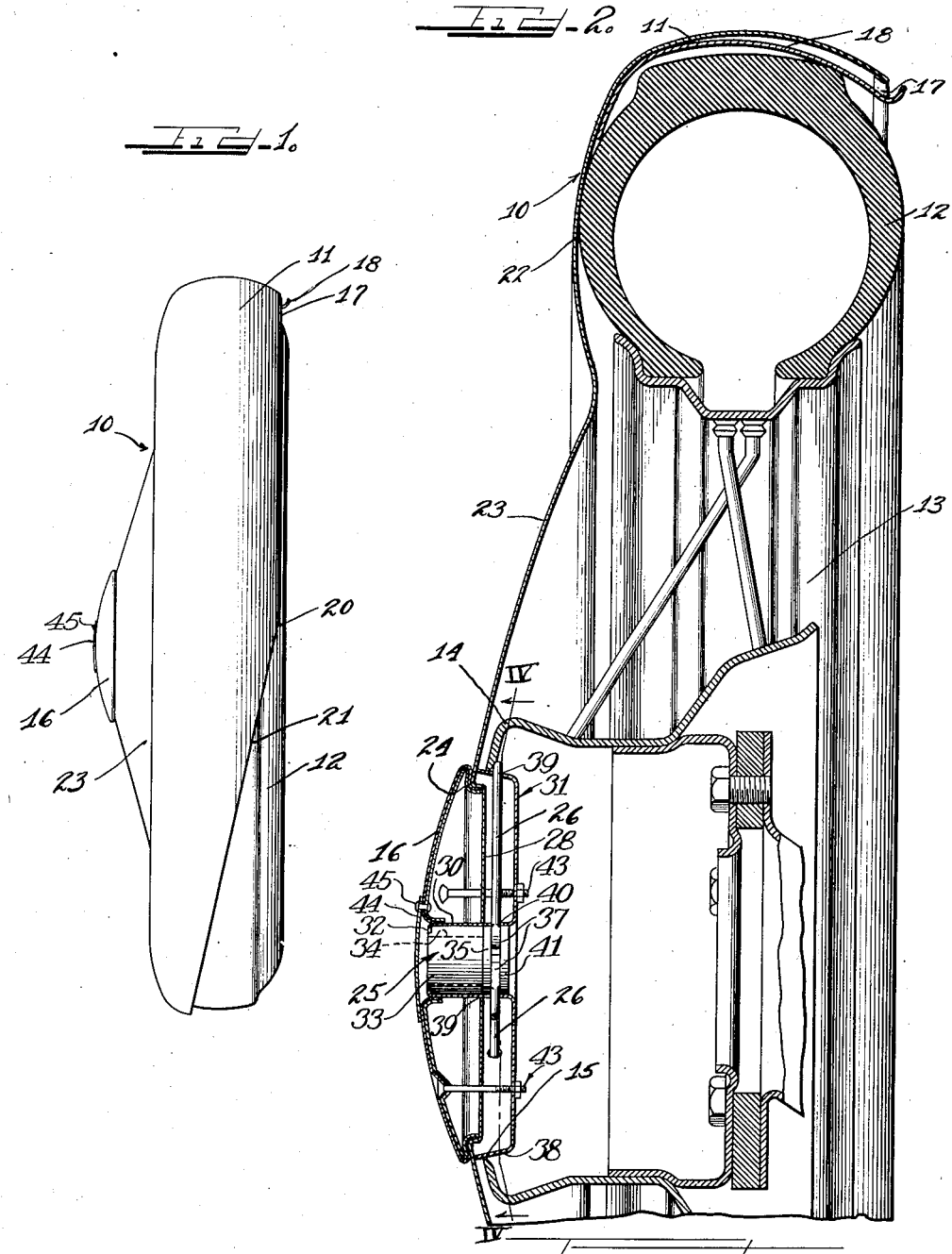
George Albert Lyon.

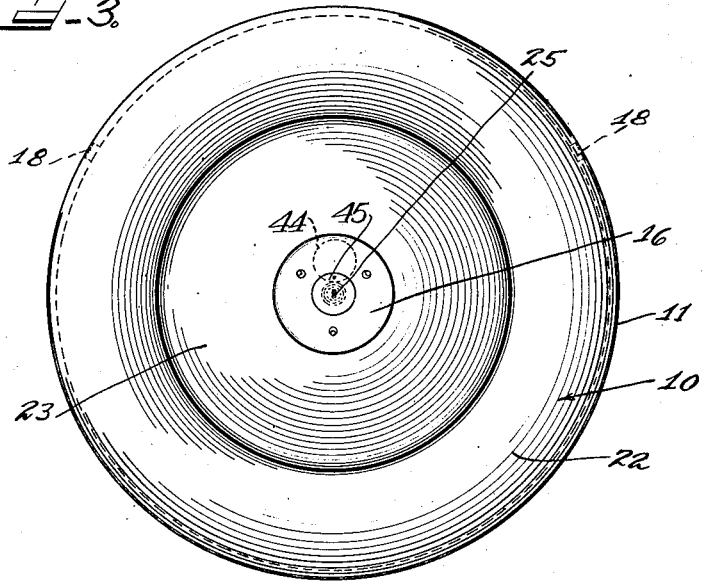
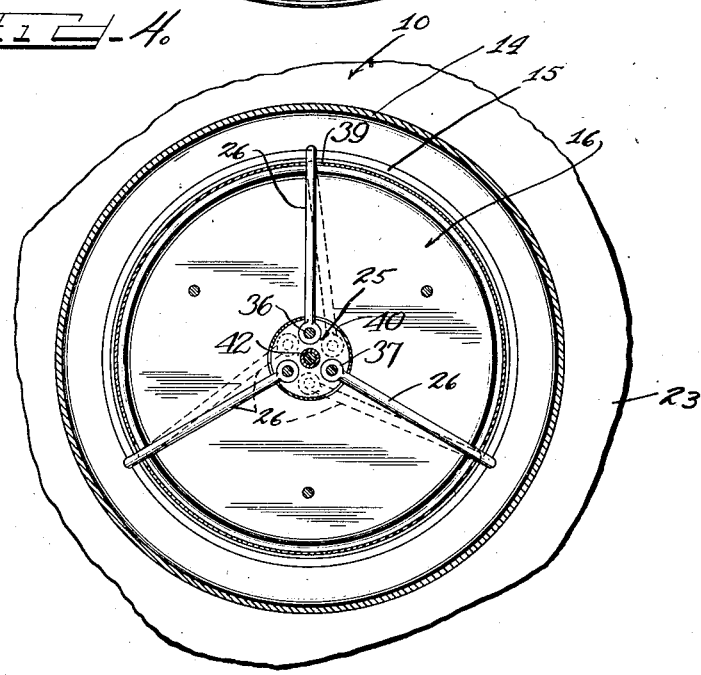

Patented Feb. 12, 1935

1,991,327

UNITED STATES PATENT OFFICE 1,991,327

SHOVE DOWN SPARE TIRE AND WHEEL COVER

George Albert Lyon, Detroit, Mich., assignor to Lyon Incorporated, Detroit, Mich., a corporation of Delaware Application August 19, 1933, Serial No. 685,833

10 Claims. (Cl. 150—54)

This invention relates to covers for spare wheel installations and more particularly to a cover for a spare wheel and tire.

An object of this invention is to provide a cover adapted to be shoved downwardly against resilient pressure and then to be clamped centrally to the hub of the spare wheel while under tension.

Another object of this invention is to provide an improved spare tire cover of the type disclosed in my copending patent application Serial No. 633,224, filed September 15, 1932, pertaining to "Tire cover."

In accordance with the general features of this invention, there is provided a spare tire and wheel cover comprising an open bottom member including a side disc and an outer tread covering band, the band being provided with resilient tire contacting means and the disc being provided centrally of the wheel with means whereby the cover may be secured to the hub of the spare wheel while the resilient contacting means is under tension by reason of its engagement with the tire tread.

Other objects and features of this invention will more fully appear from the following detail description taken in connectioin with the accompanying drawings which illustrate a single embodiment thereof, and in which Figure 1 is an end view of my cover showing it applied to a spare tire and wheel.

Figure 2 is an enlarged fragmentary cross-sectional view taken through the construction shown in Figure 1.

Figure 3 is a front view of the spare wheel construction shown in Figure 1.

Figure 4 is a fragmentary sectional view taken on the line IV—IV of Figure 2 looking in the direction indicated by the arrows, and showing the manner in which the hub cap is locked to the hub of the spare wheel.

The spare wheel and tire cover shown in the drawings embodies a disc-like side portion 10 of curved convex cross-section and an arcuate band or tread covering portion 11 which is also convexly curved. The disc portion 10 is formed for disposition over an outer side of a spare tire 12 and wheel 13. The band 11 is, on the other hand, formed for disposition over the tread of the tire 12. Both the disc portion 10 and the band 11 are of such cross-sectional shape as to conform generally with the contour of the spare tire 12.

The spare wheel 13 is of a conventional construction and includes a centrally disposed hub 14 having an opening 15 adapted to accommodate a hub cap 16 provided with key-operated lock means for locking the hub cap to the wheel hub. This hub cap and its locking means is also of my invention and is disclosed and claimed in my co-pending patent application Serial No. 686,031, filed August 21, 1933.

The two portions 10 and 11 are illustrated as being integral and as being held on the tire by reason of the central part of the disc like portion 10 being secured to the wheel hub 14 by the hub cap 16. The tread covering portion or band 11 has an inturned rear beaded edge 17 of a lesser diameter than that of the outermost periphery of the tire 12. This beaded edge 17 is disposed to the rear of the median plane of the tire and adjacent the rear side of the tire tread. Also the portion or band 11 is provided with a plurality of inwardly projecting tread contacting springs 18, preferably two in number (Figure 3) for yieldably contacting the tire 12 to the rear of the median plane of the tire. These contact springs 18 are connected at their forward ends at 18a to the interior of the cover and are each of a curved construction and are preferably made of sheet metal having sufficient resiliency to exert a yielding generally radial pressure when brought into contact with the tread of the tire. It should be noted that with the exception of the rear edge 17, the band or portion 11 is of a larger diameter than that of the tire so as to provide a space between the tread covering portion 11 and the outermost periphery of the tire 12 and in which space are disposed the two springs 18.

While the band or tread covering portion 11 is illustrated as being in the form of a substantially continuous circle, it will be evident from Figure 1 that this band is partly opened at its bottom. The upper half of this band 11 is continuous and the extremities of this half terminate substantially midway of the top and bottom of the tire as indicated at 20 in Figure 1. In other words, the rear turned edge 17 of the band 11 is in the form of half a circle and has its ends terminating at 20 whereby the cover may be initially fitted over the top of the tire and then pushed downwardly to bring the central part of the disc like portion 10 into alignment with the wheel hub 14 so that thereafter this part of the cover may be secured to the wheel hub by means of the hub cap 16. In order to facilitate this operation of applying and removing the cover to the tire, I preferably make the band 11 of a larger diameter than the diameter of the outermost periphery of the tire which it is designed to cover. This construction is possible by reason of the fact that the spacing and contacting springs 18 serve to engage the tire and prevent rattle between the cover and the tread.

The lower half of the tread covering portion or band 11 is formed by cutting this band on both sides of the tire on a bias or on a diagonal line as indicated at 21 in Figure 1. This diagonally cut edge starts at or slightly above the half-way mark of the tire and terminates at its lower end adjacent the side disc 10.

The upper end of each of the diagonal edges 21 may be slightly flared if it is so desired so as to prevent such edges from getting caught in the protuberances of the tread of the tire during the operation of applying the cover to the tire.

The side covering portion or disc 10 of the tire cover includes an annular part 22 for disposition over the outer side wall of the tire (Figure 2) and may, if it is so desired, contact that side wall. Inwardly of this annular part 22, the side disc 10 is provided with an outwardly bulged central part 23 which has a central opening 24 of a size substantially commensurate with that of the opening 14 in the wheel hub 14. This centrally disposed opening 24 is adapted to accommodate the wheel hub cap 16 so that this cap may be brought into engagement with the edge of the opening 24 to secure and lock the cover centrally of the wheel to the wheel hub.

The hub cap 16 when in position is adapted to overlap the edge of the opening 24 in the side disc 23 so as to clamp the same to the wheel hub 14. The hub cap 16 is in the form of a single unit and embodies a centrally disposed key-operated lock 25 for controlling the movement of lock plungers 26 (Figures 2 and 3) into and out of locking cooperation with the internal surface of the hub flange defining the opening 15 in wheel hub.

The disc portion 23 has a substantially central depressed portion 28 having a substantially central opening 29 through which the sleeve projection 30 of a cup shaped housing 31 projects forwardly. The sleeve 30 receives and is interlocked at 32 with a lock barrel 33 in which is disposed a rotary key-controlled lock cylinder 34. This cylinder carries rearwardly thereof a flange plate 35 from which extend pivot studs 36 on which the eyes 37 of the latching members or pins 26 are pivotally carried.

The housing 31 has a substantially frusto-conical outer wall 38 and, for each pin 26, a set of substantially registering openings 39 and 40 of such size as to permit the eye 37 of each pin 26 to pass therethrough to enable the eyes to be positioned in the sleeve 30 so as to be assembled with the studs 36. The retainer plate 41, held in place as by a stud 42, holds the parts in properly assembled relation.

Suitable fastening means 43 hold the cap part 16, depressed portion 28 and housing 31 in properly assembled relation. A closure 44, swingably secured at 45 to the front of the cap 16, may be frictionally held in the desired position to conceal or reveal the key opening.

The mechanism is so constructed and arranged that when the lock cylinder is rotated in one direction, the latch pins move outwardly into engagement with the rear surface of the front wall of the wheel hub 14, and when the lock cylinder is rotated in the opposite direction, said pins are retracted as shown in dotted lines in Figure 4, sufficiently to clear the hub 14 when it is desired either to remove the unit from or insert the same into the hub, yet to be held within the openings therefor in the wall 38.

In the application of the cover to the tire, the upper half of the cover is hooked downwardly over the upper half of the tire whereby the contacting and spacing springs 18 are placed under tension as they are brought into engagement with the tire tread. Thereafter, the lower half of the cover is pushed laterally onto the tire whereby the central opening 24 in the side disc 10 is brought into alignment with the opening 15 in the wheel hub 14. Then when the cover is in that position with the springs 18 under tension, the central part of the side disc 10 is clamped to the wheel hub and locked thereto by means of the hub cap 16 which is inserted in the wheel hub and locked thereto by manipulation of its key-operated locking mechanism.

Now I desire it understood that while I have illustrated and described in detail the preferred embodiment of this invention, the invention is not to be thus limited but only insofar as defined by the scope and spirit of the appended claims.

I claim as my invention:

1. As an article of manufacture, a spare tire and wheel cover member comprising tire side and tread covering portions and resilient tire contacting means, and having an open bottom to enable the member to be shoved downwardly against the resilient pressure of said means, said side covering portion being provided centrally of the cover with means whereby it may be secured to the hub of the spare wheel while the resilient means is under pressure.

2. In a spare tire and wheel cover, a circular band for disposition over the tread of the tire which is continuous with substantially a half of the tire circumference so as to completely cover the upper half of the outermost periphery of the tire and which band has its lower half cut on a diagonal from the rear of the band in a direction toward the front of the band on both sides of the tire below the upper half thereof so as to facilitate application of the band to the tire, and a side disc portion associated with said band for disposition over the outer side of the tire and provided centrally of the spare wheel with means whereby the cover may be centered on the tire and secured to the hub of the spare wheel.

3. In a spare tire and wheel cover, a circular band for disposition over the tread of the tire which is continuous with substantially a half of the tire circumference so as to completely cover the upper half of the outermost periphery of the tire and which band has its lower half cut on a diagonal from the rear of the band in a direction toward the front of the band on both sides of the tire below the upper half thereof so as to facilitate application of the band to the tire, and a side disc portion associated with said band for disposition over the outer side of the tire and provided centrally of the spare wheel with means whereby the cover may be centered on the tire and secured to the hub of the spare wheel, said means including a centrally disposed opening of a size commensurate with that in the wheel hub so as to accommodate a hub cap whereby the hub cap may clamp the central part of the disc like portion to the wheel hub.

4. In a spare tire and wheel cover, a circular band of curved transverse cross-section and being interiorly concave, said band being circumferentially arcuate throughout substantially more than 180° and having its lower half cut away on both sides of the tire to such an extent that the band may be with facility shoved over the tread of the tire so that its lower portion may hug the under side of the tire to pull down the upper half of the band on the tire and into engagement with the outer periphery and tread of the tire, said band with the exception of said cutaway portion being continuous and having interiorly disposed spring means for contacting the tire, and a side disc portion associated with said band for disposition over the outer side of the tire and being provided centrally of the cover with means whereby it may be secured to the hub of the spare wheel.

5. As an article of manufacture, a spare tire and wheel cover member comprising tire side and tread covering portions and resilient tire contacting means, and having an open bottom to enable the member to be shoved downwardly against the resilient pressure of said means, said side covering portion being provided centrally of the cover with means whereby it may be secured to the hub of the spare wheel while the resilient means is under pressure, said tread covering portion being in the form of a circular band of curved transverse cross-section and being interiorly concave, said band being circumferentially arcuate throughout substantially more than 180° and having its lower half cut away on both sides of the tire to such an extent that the band may with facility be shoved over the tread of the tire and so that the lower portion may thereafter be pushed under the tire to bring said centrally disposed means on the side covering portion into a position where the same may be secured to the hub of a spare wheel so as to hold the cover in proper tire protecting position on the tire.

6. The combination with a spare tire cover adapted to be shoved downwardly onto the tire and including resilient tire contacting means formed to be placed under tension by the act of shoving the cover downwardly on the tire, of means disposed centrally of the cover for holding said cover on the tire and against the tension of said resilient means.

7. The combination with a spare tire cover adapted to be shoved downwardly onto the tire and including resilient tire contacting means constructed and arranged to be placed under tension by the act of shoving the cover downwardly on the tire, of means disposed centrally of the cover for holding said cover on the tire against the tension of said resilient means, said holding means being detachable whereby said resilient means is thereafter free to urge the cover upwardly away from the tire.

8. The combination with a spare tire cover adapted to be shoved onto the tire and including resilient tire contacting means formed to be placed under tension by the act of positioning the cover on the tire of means disposed centrally of the cover for holding said cover on the tire with said resilient means under tension.

9. The combination with a spare tire cover adapted to be shoved onto the tire and including resilient tire contacting means formed to be placed under tension by the act of positioning the cover on the tire of means disposed centrally of the cover for holding said cover on the tire with said resilient means under tension, said holding means being concealed but being releasable to permit removal of the cover.

10. The combination with a spare tire cover adapted to be shoved onto the tire and including resilient tire contacting means formed to be placed under tension by the act of positioning the cover on the tire of means disposed centrally of the cover for holding said cover on the tire with said resilient means under tension, said resilient means comprising a plurality of circumferentially spaced tread contacting springs and said holding means extending inwardly at the center of the cover for cover retaining cooperation with the hub of a wheel carrying the spare tire.

GEORGE ALBERT LYON.